United States Patent [19]

Bitzer et al.

[11] 4,364,746

[45] Dec. 21, 1982

[54] ABRASIVE MATERIAL

[75] Inventors: Diethelm Bitzer, Hechingen-Stetten, Fed. Rep. of Germany; Jost Kramis, Islikon; Jakob Ackermann, Wigoltingen, both of Switzerland

[73] Assignee: SIA, Schweizer Schmirgel- u. Schlief-Industrie AG, Frauenfeld, Switzerland

[21] Appl. No.: 197,193

[22] Filed: Oct. 15, 1980

Related U.S. Application Data

[63] Continuation-in-part of Ser. No. 24,199, Mar. 27, 1979, abandoned.

[30] Foreign Application Priority Data

Mar. 28, 1978 [DE] Fed. Rep. of Germany ....... 2813258

[51] Int. Cl.³ .............................................. C09K 3/14
[52] U.S. Cl. ....................................... 51/298; 51/296; 51/304; 51/307
[58] Field of Search ................... 51/296, 298, 304, 307

[56] References Cited

U.S. PATENT DOCUMENTS 2,194,472 3/1940 Jackson ................................. 51/298
2,216,728 10/1940 Benner et al. .......................... 51/298

FOREIGN PATENT DOCUMENTS

| | | |
|---|---|---|
| 1427591 | of 0000 | Fed. Rep. of Germany . |
| 1694703 | of 0000 | Fed. Rep. of Germany . |
| 1752612 | of 0000 | Fed. Rep. of Germany . |
| 2348338 | of 0000 | Fed. Rep. of Germany . |
| 2350139 | of 0000 | Fed. Rep. of Germany . |
| 2410808 | of 0000 | Fed. Rep. of Germany . |
| 2417196 | of 0000 | Fed. Rep. of Germany . |
| 2516008 | of 0000 | Fed. Rep. of Germany . |
| 2608273 | of 0000 | Fed. Rep. of Germany . |
| 2718308 | of 0000 | Fed. Rep. of Germany . |

OTHER PUBLICATIONS

Journal Chemie Technik, vol. 6, No. 11, pp. 477-481.
Journal Chemie-Ing.-Techn., vol. 42, 1970, No. 9/10, pp. 659-669.
Journal Chemie-Technik, 1977, p. 478.
Chemical Engineer's Handbook, Fifth Ed., 1973, pp. 8-65, McGraw Hill, New York.
Jenkins, G. and Kawamura, K., "Polymeric Carbons--Carbon Fibers, Glass and Char.", Cambridge Univ. Press, Cambridge, 1976.

*Primary Examiner*—Donald E. Czaja
*Assistant Examiner*—W. Thompson
*Attorney, Agent, or Firm*—Browdy & Neimark

[57] ABSTRACT

An abrasive compound in which individual abrasive grains of various types are joined in a preliminary step into the formation of so-called agglomerated abrasive grains, each of which may contain a number of individual grains. The particular feature of the invention is that the abrasive compound which is to be applied to a suitable surface to constitute an abrasive or grinding tool consists of a mixture of agglomerated abrasive grains of substantially different types. The differences in the agglomerated abrasive grain refer principally to the abrasive power and strength and the ability to sustain abrading forces, i.e., they are related to the endurance of the agglomerated grains under conditions of use. The substantially different strengths or properties of the agglomerated abrasive grains may derive from different types of binder used to create them from the individual grains, different methods of hardening or drying, different quantities of binder, or different constituent individual grains. The mixture of agglomerated abrasive grains of substantially different strength may be used with a component of non-agglomerated grains as well as with a reinforcing additive of short, chopped carbon or graphite fibers. Various embodiments are presented.

17 Claims, No Drawings

4,364,746

ABRASIVE MATERIAL

RELATED APPLICATION

This application is a continuation-in-part application of Ser. No. 024,199 filed Mar. 27, 1979 now abandoned. The entire contents of the parent application Ser. No. 024,199 is incorporated in the disclosure of this application.

FIELD OF THE INVENTION

The invention relates to abrasives on a carrier or base as well as to a method for the production and use of agglomerated abrasive grain.

BACKGROUND OF THE INVENTION

The cutting power and the surface quality obtained with different abrasives, especially those that are carried on a flexible base, change with the degree of wear. During their use, the abrasive or grinding materials are progressively dulled so that the cutting depth is decreased until the grinding tool must be replaced. A great deal of experiment and development effort has been expended to create abrasives and grinding tools which provide improved material removal rates and increased lifetimes as well as improved surface cutting depths. A generally known disadvantage of these existing abrasive tools is the fact that the amount of material removed per unit time, i.e., the material removal rate, is initially high and then rapidly decreases so that in many cases the abrasive tool must be replaced after a relatively short time, even though the base on which the abrasive compound is held is still fully intact. Past efforts have been directed to changing the disposition of the abrasive grain in order to obtain more economical results.

The German Pat. No. 14 27 591 describes abrasive compounds which consist of a plurality of small, separated but bound abrasive elements which are embedded in a continuously yielding thermoplastic resinous mass which contains abrasive grain. After the production of a large mass of abrasive grain and organic, resin-like or rubber-like, heat hardenable plastics, the individual little grinding elements are formed and introduced into the larger mass.

The German Offenlegungsschrift No. 17 52 612 describes elastic abrasive grains in which the elastic binding material contains abrasive grains consisting of a plurality of individual grains and fixedly bound conglomerates.

From the German Offenlegungsschrift No. 23 48 338, it is known to place the abrasive grain in the abrasive grain layer as a plurality of hollow elements consisting of abrasive grain and binder.

The German Offenlegungsschrift No. 25 16 008 describes spherical grinding elements consisting of abrasive grains and a method for their production in which the carrier material is a thermoplastic material whose interior is substantially hollow and onto whose outer surface the grinding elements are molded.

The German Offenlegungsschrift No. 24 17 196 describes a method for producing abrasive elements on a base in which the abrasive belts consist of a carrier, the grinding particles, and base and covering materials. This publication indicates the advantages with respect to previously known grinding materials which consist of granulated grain and which are described in the German Pat. No. 14 27 591 and the German OS No. 17 52 612. According to this publication, the abrasive effort is increased, the grain and the carrier are utilized better but the abrasive grain acts somewhat as a compact abrasive grain of the same size, i.e., the cutting depths are substantially greater and less regular.

The German OS No. 16 94 703 describes a method for producing a resin-embedded grinding element in which abrasive particles are covered with silicone resin and the particles are then processed in a synthetic resin to a particular finished shape. The method is particularly distinguished by using corundum particles as the abrasive particles and these are provided with a silica coating prior to being covered with silicone resin. The silica coating may be applied by melting or sintering. The grinding compound obtained in this way is then treated with $\gamma$-amino propyl ethoxy silane.

In the U.S. Pat. No. 2,194,472 (Jackson) the production of abrasive materials is described. The Jackson patent describes the manufacture of aggregate grains, the binders used to prepare the same and the binders used to fix the aggregate grains onto the flexible backing. At no point is there any mention of mixtures of different firmly bound agglomerates nor is this a decisive and critical step of the Jackson patent. Thus, only the production of agglomerate abrasive grains and their arrangement in the abrasive means are shown and all of the aggregates used in any given abrasive element have the same, that is identical, binder and thus the same strength.

OBJECTS AND SUMMARY OF THE INVENTION

It is thus a principal object of the present invention to provide an abrasive element or an abrasive compound on a suitable base which does not entail the aforementioned disadvantages of the known agglomerated grinding compounds. An associated object of the invention is to provide an abrasive material which results in relatively small and uniform cutting depths, which wears uniformly at average abrasive pressure and provides a high amount of material removal.

It is a further object of the invention to provide a grinding tool in which the area abrasive which may be flexible is reinforced and supported while the abrasive grain is held firmly and stably in place although being elastically attached to its carrier.

It has been found unexpectedly that these objects are all attained in an abrasive material according to the present invention which is distinguished by an intimate mixture of agglomerated abrasive grains of substantially different strengths. This mixture of agglomerated abrasive grains of substantially different strengths is applied by a commonly used binder to the carrier material. It is a further feature of the invention that the binder which is used to apply the agglomerated abrasive grains to the carrier is mixed with fibers of carbon or graphite.

DETAILED DESCRIPTION OF THE INVENTION

The invention is applicable specifically to abrasive materials, grinding elements, etc., in which the binder contains the abrasive grains as conglomerates (i.e., agglomerated abrasive grain) consisting of a plurality of individual grains and the agglomerated grains are bound by resin and are separately hardened. Furthermore, the individual agglomerated grains which may be placed on a carrier or formed into an abrasive element have substantially different rigidity or strength and they may be bound by the same or different resin binders. However, the agglomerated abrasive grains which have substantially different rigidity may be intimately mixed with a common binder on a carrier or may be formed into an abrasive element.

The definition of the terms necessary to describe the invention will now be given in detail. The concept of "agglomerated abrasive grain" is not used only in the limiting sense described in the journal *Chemie Technik*, Vol. 6, No. 11, page 477–481, especially paragraph 2.2 on page 478, but it is to be used in the sense of including agglomerated abrasive grains which are agglomerates, granulates, or even encapsulated granulates. All of these combinations of grains will henceforth be referred to as agglomerated abrasive grains. These agglomerated grains may also include voids or pores which may be filled with active fillers or supplementary materials. The resins which are used for producing the abrasive materials or abrasive elements according to the invention will henceforth be distinguished roughly as resin I and resin II. Resin I will be defined as the first binder which serves for the separate production of the agglomerated abrasive grains (for example agglomerates, granulates, encapsulated granulates, conglomerates of bound individual grains) and this resin I serves to hold together a plurality of individual abrasive grains in an agglomerate grain. The resin II will be defined as the second binder by which the separately produced agglomerated grains are then mounted or adhered to the specific carrier or which is used to mold or form a particular abrasive or grinding element, such as wheels, discs, etc.

The invention also relates to abrasive means in which ordinary, i.e. non-agglomerated abrasive grains are used in addition to the agglomerated abrasive grains of different strength. Both types of grains may have pores or hollow spaces which may be filled with active or inactive supplementary or filler materials. In the production of the agglomerated grains by means of resin I, the individual grains from which the agglomerates are made may be natural or synthetic minerals so that the mixture of agglomerate grains of substantially different strength may consist basically of abrasive grains of substantially different kinds and/or a mixture of individual grains. These basic abrasive grains may be for example grains of corundum, zircon corundum, spinel corundum, carbide, such as silicon carbide, boron carbide, nitrides, diamond, ruby, flint, etc.

It is a feature of the present invention that the separatetly produced agglomerate abrasive grains of substantially different strength may include pulverized glassy carbon, for example vitreous carbon such as described in the Journal *Chemie-Ing.-Techn.*, Vol. 42, 1970, No. 9/10, pp. 659–669, and which may be pulverized or directly produced pulverized glassy carbon (according to the German patent application No. P 27 18 308.0).

The principal feature of the present invention is the use of an intimate mixture of separately produced agglomerated abrasive grains, possibly in addition to non-agglomerated abrasive grains. The mixture must contain agglomerated abrasive grains of substantially varying rigidity and strength resulting in different rates of wear. Under no circumstances can the invention function properly when the agglomerated abrasive grains all have the same strength and rigidity and the use of such agglomerates of uniform strength has already been described in the German Pat. No. 14 27 591 as well as in the German OS No. 17 52 612. It is the unexpected and surprising result of the present invention that when a mixture of agglomerated abrasive grains of substantially varying strength is used according to the invention in the production of abrasive means or elements, then all of the disadvantages of the grinding materials described in the German Pat. No. 14 27 591 and in the German OS Nos. 17 52 612 and 24 17 196 are avoided.

The use of the mixture according to the invention which involves a combination of agglomerated abrasive grains of substantially different strength, possibly in addition to the use of non-agglomerated abrasive grains, on a suitable carrier, results in a uniform cutting depth, a very uniform rate of wear and a long lifetime of practical use of the abrasive element. When agglomerated and non-agglomerated abrasive grains are used, the proportion of non-agglomerated abrasive grains may be as high as 70% of the weight of the agglomerated abrasive grains.

It is possible within the prescriptions of the present invention to employ agglomerated abrasive grains as spherical elements or hollow spheres, for example as described in the German AS Nos. 23 48 338; 24 10 808; 23 50 139; the German OS Nos. 26 08 273 and 25 16 008. However, the significant distinction with resect to the grinding materials described in all these publications will be, according to the invention, that the spherical or hollow elements are used in a mixture containing such elements of substantially different, although controlled, strength and thus different rates of wear. It is further within the scope of the invention to use agglomerated abrasive grains of very different configurations (for example agglomerates, granulates, or capsulated granulates in the sense described in the Journal Chemie-Technik, 1977, p. 478) in a mixture also containing spherical abrasive elements and/or hollow elements, as long as the overall mixture is an intimate mixture of substantially different rigid individual elements (agglomerated abrasive grains, hollow elements, etc.). It is also possible according to the invention to produce agglomerated abrasive grains containing voids or pores and these, as well as the pores of individual abrasive grains, may be filled with per se known fillers and additives, for example sodium fluoroborate, cryolite, or chloroparaffines.

In these non-homogeneous mixtures, it is again the substantive condition of the present invention to require the use of agglomerated abrasive grains, of whatever shape, which exhibit substantially different strength and rigidity. Such substantially differing strengths of the various agglomerated abrasive grains are obtained when the separately produced agglomerated grains are made by the use of a great variety of different resinous binders (resin I) and the use of a large variety of different additional substances, for example active fillers, auxiliary substances, adhesives, separators and the like. It is also possible and advantageous in the production of the agglomerated abrasive grains not only to use different resins I, for example phenolic, alkyd, urea, epoxy, melamine, furane, acrylic, cyanoacrylate, cyanate, polyurethane ABS dispersions, but even to use similar or identical resins to bind the various individual grains together in agglomerates. In the latter case, the substantially varying rigidity and strength of the agglomerated abrasive grains will be obtained through the use of different quantities of resin I. The production of agglomerated grains of substantially different strength which are brought onto the carrier as a mixture, can also be obtained, in addition to the methods of using substantially different resins, substantially different heardening time or substantially different quantities of resin, by a variety of other methods, for example by the use of additives as aminosilanes, unsaturated silanes, chromium complexes, silicone release agents, fatty acid esters, synthetic fluorine compounds, or emulsions, for example water-in-oil or oil-in-water emulsions, especially, and preferably, water-in-oil emulsions such as are described for example in the publication "Grenzflächenaktive Aethylenoxyd-Addukte" by N. Schonfeldt; Wissenschaftliche Verlagsgesellschaft mbH, Stuttgart, 1976, p. 199–224. In order to prepare an emulsion of the water in oil type, an emulsifier having an HLB number of 4–6 is used.

The aggolmerated abrasive grains of substantially different strength may also be obtained by the addition of equal or different amounts of commonly used fillers such as kaolin, chalk, etc. in the resin I. These supplements can be used in different or equal amounts in resin I and the resultant aggomerated abrasive grains will have substantially different strength, and may also have different size, shape, and/or composition and they are applied by means of a resinous binder (resin II), to the carrier of suitable construction.

It is also possible according to the invention to coat individual abrasive grains with a thin layer of a ceramic material, (silica), a binding material or an organic resin. The grains so treated are then processed with resin I and further supplements, the use of different amounts of resin I, etc., so as to obtain agglomerated abrasive grains of substantially different strength.

The various batches of agglomerated abrasive grains, each having a substantially different strength, are provided in known manner, for example in a graining drum, a graining plate, in a fluidized spray granulator or a spray dryer. They may also be obtained simply by drying and hardening a mixture of abrasive grain and a resin I binder, possibly with the addition of one or more of the above-cited or additives, within a furnace or by agglomeration of an aqueous suspension or dispersion. These known production steps are also described in "Chemical Engineer's Handbook," Fifth Edition, 1973, Pages 8–57 and 8–65, McGraw Hill, New York. Depending on the method used, the agglomerated abrasive grain is then sifted and/or ground to obtain grains of a desired diameter which preferably lies between 150 and 3,000 microns. If the individual grains are very fine, for example corresponding of P 180 (FEPA-Norm), then between 10 and 1000 individual grains will be contained in an agglomerated grain. If the grains are of the graininess P 36, then between 2 and 20 grains will be contained in each agglomerate grain. The agglomerated abrasive grains with substantially different strengths, each batch being prepared separately and even possibly having different shape or size, are then mixed and applied to a carrier by means of resin II or are molded into the proper shape. According to the invention, agglomerated abrasive grains of at least two substantially different strengths must be present in the mixture which may also contain components of non-agglomerated abrasive grains.

The agglomerated abrasive grains of substantially different strength according to the invention, possibly admixed with components of common abrasive grain, may be applied to a carrier of suitable type of construction, for example, paper, woven or non woven fabrics, foils, etc., or may be formed or molded to a grinding element of suitable shape by a known process.

The second binder (resin II) for binding the various agglomerate abrasive grains, may suitably be for example glutenous adhesives, or various resins, for example urea-formaldehyde, phenol-formaldehyde, epoxy resins, and/or alkyd resins. It is also common practice to add fillers to these binders.

Abrasive elements and tools are then manufactured according to a known process, in this case by fixation of agglomerated abrasive grains having substantially different strength and, possibly added normal abrasive grains on the base with the aid of a suitable binder, i.e., resin II. Usually, a primary or base layer of resin II is applied to the surface of the carrier. After the application of the abrasive grains and a preliminary fixation by drying and/or hardening of the primary layer, a second or cover layer is applied in order to enhance the embedment and stability of the grains. The disposition of the agglomerated abrasive grains may be "closed," i.e., with the grains making contact with one another, or "open," i.e., with spaces between grains.

A second principal feature of the invention is the provision of a method making abrasive elements and tools and involving the use of an additive to the second binder (resin II). This additive is, preferably, a quantity of short-chopped carbon and/or graphite fibers. The augmented binder may be used to bind agglomerated abrasive grains alone, or a mixture of grains including non-agglomerated grains up to 80% of the weight of the agglomerated grains. The quantity of short-chopped carbon or graphite fibers in the resin II binder which is used as cover binder may be as high as 20% of the total weight of the binder, preferably 1–10%.

The resin II binder, possibly augmented in the above-described manner by up to 20 weight % with carbon or graphite fibers, may also be used for binding and embedding ordinary, i.e., non-agglomerated, abrasive grains. Preferably the carbon or graphite fibers which are obtained in commerce as "tows" usually in a length of over 1 meter, are chopped to a length of between 0.1–7 mm prior to being mixed with resin II. The carbon or graphite fibers are made in known manner, for example from polyacrylontrile, cellulose, asphalt, tar, pitch, rayon, etc. The properties and production of carbon and/or graphite fibers according to the invention are described in the publication "Polymeric Carbons-Carbon Fiber, Glass and Char" by G. M. Jenkins and K. Kawamura, Carbridge University Press, Cambridge, 1976. When the abrasive elements according to the invention are made, the carbon or graphite fibers may be mixed with binding materials (resin II), for example glutinous glue, aqueous precondensates of urea formaldehyde resin, phenol formaldehyde resin, as well as epoxy resins, mainly two-component resins, cyanate resins, alkyd resins or polyurethane resins. The mixture may contain additives, for example, active or inactive fillers, glass fibers, asbestos, aromatic polyamide filbers, chalk, or kaolin.

It has been unexpectedly found that natural as well as synthetic grains, both in the shape of agglomerated grains as well as in the form of the usual individual grains, can be held very firmly but elastically on a carrier material, for example paper, fabrics or foils in a durable manner if the binder (resin II) is admixed with short-chopped carbon or graphite fibers. The binder so admixed is then used as the base or primary binding layer as well as the cover layer. The covering binder according to the invention (resin II) has a low coefficient of friction and the grinding elements made in this way have a high modulus of elasticity, great strength, good thermal and electrical conductivity and a low coefficient of thermal expansion. These properties have a beneficial effect not only on the binder layer of the carrier but also on the abrasive grain embedded in the resin II reinforced by the short carbon fibers and impart thereto desirable properties, for example long life, resistances to soiling and great strength.

The abrasive mixtures and abrasive elements made according to the invention will now be exemplified by the recitation of specific embodiments and variants thereof which are given entirely by way of non-limiting examples.

The relative strength and the difference of strength resp. of agglomerates according to this invention can be determined by the following method:

In a round ½ l-powder flask made of LDPE (diameter 76±2 mm) 36 porcelain spheres are placed (diameter: 19.1±0.5 mm; weight 8.4±0.3 g) and 10 g of an agglomerate fraction obtained by filtering out.

The powder flask prepared in this way is closed with a screwtop of LDPE and rotated for 10 min. at 50±1 rpm on a 2-roller drive. Then it is filtered and the residue is weighed on said filter. Hence the percentage share of undestroyed agglomerate can be measured.

For the manufacture of the abrasives according to the invention, at least two substantially different strength agglomerate types must be used. It is a preferred embodiment of the invention if one type has according to the above method at least a strength of 90% (=90% of undestroyed agglomerate) while the other type exhibits at the most a strength found by the above method of 70% (=70% of undestroyed agglomerate). A difference in strength of at least about 20% is especially preferred. It is obvious that with every manufacturing method, strength differences within narrow limits will occur for a single type of agglomerate. But by the mixing of at least two types of agglomerate, which have a substantially differing strength of about 20% or more, in a controlled manner, a very much wider distribution of the strengths is attained. This is not possible when using agglomerate grains made in a uniform way, as is described by the prior art.

Whenever the term "substantially different strength qualities" is used throughout the specification and claims, it should be understood that the difference in the strength qualities should be at least approximately the same degree as the differences illustrated by the above method for determining the strength of agglomerates.

EXAMPLE 1

An abrasive compound of agglomerated abrasive grains of varying rigidity and strength made from corundum of the graininess P 180 (FEPA-Norm) and a binding agent (resin I) is produced in a number of variants and in the usual manner by application to a base or carrier for abrasive material consisting of surface-finished cotton weave in amounts of approximately 250 g/m². The binding material (resin II) is commercial phenol-resol resin (without filler for the use as the primary basic binding layer and admixed with 50% chalk as the covering layer). The different strengths of the agglomerated abrasive grains are obtained in variant A by using different quantities of binder whereas they are obtained in the variant B by using different resins and in variant C by the addition of supplementary additives and finely powdered glassy carbon.

Variant A

The different batches, each consisting of a mixture of aqueous phenol resol resin and brown corundum (96.4% $Al_2O_3$) of a graininess of P 180 (FEPA-Norm), the first batch having a ratio of solidified binder to abrasive resin of 0.30, the second batch having a ratio of 0.25 and the third batch a ratio of 0.20, are dried in an oven and hardened for two hours at 70° C., four hours at 85° C., eight hours at 105° C. and two hours at 120° C. These batches are then ground in a hammermill and components between 200 and 350 microns are screened out. Equal quantities of each of the three batches are intimately mixed and are applied to the carrier.

Variant B

Two equal quantities of brown corundum of the graininess of P 180 are prepared as follows: In one case the corundum is mixed with aqueous phenol resol resin and 20 weight % of chalk and in the second case with aqueous urea-formaldehyde precondensate and 15 weight % kaolin in a ratio of grain-to-binder of 0.20. The two batches are then dried and hardened (the phenol resol resin is treated as in variant A, the urea resin is treated as follows: two hours at 50° C., four hours at 65° C. and 24 hours at 80° C.). The material is then ground and components having diameters between 200 and 350 microns are screened out. Equal quantities of phenol resin agglomerate, urea resin agglomerate and normal brown corundum of graininess P 180 are mixed together and applied to the carrier.

Variant C

One batch of aqueous phenol resol resin is mixed with cryolite, sodium fluoroborate and brown corundum of a graininess of P 180 in the ratio of substances 2:1:1:7. Another batch of phenol resol resin is mixed with finely powdered, glassy carbon and the brown corundum of the same graininess as above in the ratio of substances 2:1:7 whereafter both are dried and hardened. The batches are milled, sifted and admixed as described in variant A and are applied to the carrier.

The abrasive elements produced in the above-described manner according to variants A, B and C are processed in a per se known manner into endless abrasive belts and tested on an abrasive testing machine at a belt velocity of 30 meters per second on a test material which, in this case, was steel, type 37. It was found that the abrasive belts made with the abrasive grain according to the invention have a substantially higher material removal rate and lifetime than do belts made with the common, non-agglomerated brown corundum of graininess P 180. Furthermore, the scratching depth remains constant during the test and does not change appreciably at all between the first and ninth tenth of the test time. Furthermore, the initial scratching depth of all the belts is almost the same.

EXAMPLE 2

Brown corundum of graininess P 36 is used in one batch and a second batch is mixed from a 1:1 mixture of brown corundum and zirconium corundum (approximately 40% $ZrO_2$) of graininess of P 36. Each is mixed separately with aqueous phenol resol resin (the weight of the grain being one-tenth of the weight of the solid resin) whereafter they are slowly heated to 110° C. under constant rotation in a rotationally symmetric vessel. The two batches are hardened for four hours at 120° C., the sifted components between 700 and 1200 microns are mixed and the mixture of agglomerated abrasive grains is applied in known manner to an abrasive carrier consisting of fiber of a thickness of 0.82 mm and in the quantity of approximately 900 g/m². The primary and covering binders are commercial phenol resol resin and the covering layer is mixed with 50 weight percent of chalk.

The abrasive compound produced in this way is processed in a punching press to obtain fiber discs of a diameter of 180 mm with a central hole of 20 mm. The abrasive properties are compared with discs covered with non-agglomerated abrasive compounds of the same graininess (P 36 brown corundum and zirconium corundum in the ratio of 3:1). When these grinding elements were used for grinding automobile chassis parts, the disc made with the agglomerated grain mixture exhibited improved material removal and longer life. Furthermore, the surface of the abrasive disc tended to clog and load up substantially less than in the known disc material.

EXAMPLE 3

Semi-precious corundum of graininess P 120 is sprayed in a fluidized spray granulator at a temperature of 110° C. with aqueous phenol resol resin (the weight of the grains being one-tenth of the solid body weight of the resin). The binder contains one weight percent of commercial silicon release agent on the basis of polydimethyl siloxane oil in emulsified form. The same process is used to obtain an agglomerate consisting of semi-precious corundum of the graininess of P 120 treated with aqueous phenol reson resin without separator and surrounded by iron oxide. The two batches are hardened separately at 120° C. for four hours and sifted. The components with an agglomerate grain diameter between 300 and 500 microns are intimately mixed. A first binder layer consisting of aqueous phenol resol resin and four weight percent of graphite fibers of a length between 1 and 2 mm is applied to a depth resulting in 290 g/m² after which the mixture of agglomerate abrasive grains is applied in the usual manner, dried and prehardened. A second binder layer consisting of 60 weight percent of phenol reson resin, 30 weight percent of chalk, 10 weight percent of short chopped graphite fibers (1–2 mm) and water are then applied, whereafter the whole is dried and hardened. The abrasive grit is used to produce endless belts and the abrasive properties are compared in an experiment with respect to commercial abrasive belts containing a 100% resinous binder in a wood-abrading test during the production of furniture. The belts having the agglomerated abrasive grain and the graphite fiber have an improved lifetime and, even after use, exhibit virtually no soiling or loading of the grinding surface. Furthermore, the belts according to the invention do not acquire an electrostatic charge, in distinct contrast to the known test belts.

The foregoing refers to merely exemplary but entirely non-limiting examples of the abrasive material according to the invention and numerous other variants thereof are possible without departing from the scope of the invention.

What we claim is:

1. In an abrasive carrier containing abrasive grains, at least a substantial portion of which comprises individual agglomerate abrasive grains each comprising a plurality of single abrasive grains bound together by a first binder, said grains being bound to a carrier or formed into an abrasive element by means of a second binder, the improvement by which a uniform cutting depth, a uniform rate of wear and a long lifetime of practical use are achieved, wherein said agglomerate abrasive grains comprise a plurality of substantially different groups of agglomerate abrasive grains, each of which groups exhibit substantially different structural strength qualities, and therefore different abrasive power and ability to sustain abrading forces, from the other group or groups, the grains of all said groups being mixed together prior to application to said carrier or formation into said element.

2. An abrasive in accordance with claim 1 wherein said abrasive grains bound to said carrier or formed into said element comprise both said agglomerate abrasive grains of substantially differing strength and non-agglomerated abrasive grains.

3. An abrasive in accordance with claim 1 wherein said abrasive grains bound to said carrier or formed into said element consist of said agglomerate abrasive grains of substantially differing strength.

4. An abrasive in accordance with claim 1 wherein at least a portion of said agglomerate grains and at least a portion of said single abrasive grains used in said agglomerate grains and, if present, in addition to said agglomerate grains, have pores or hollow spaces.

5. An abrasive in accordance with claim 4 wherein at least a portion of said pores or hollow spaces are filled with additives or filler material.

6. An abrasive in accordance with claim 1 wherein said abrasive grains comprise one or more members of the group consisting of corundum, zirconium corundum, spinel corundum, carbide, nitride, diamond, ruby, flint and emery.

7. An abrasive in accordance with claim 1 wherein said first binder used for the formation of each of said different groups of agglomerate grains is selected from the group consisting of phenolic and urea, resins.

8. An abrasive in accordance with claim 1 wherein said agglomerate grains are bound to a carrier and wherein, in addition to said agglomerate grains, there is also bound to said carrier up to 70%, based on the total weight of said agglomerate grains, of non-agglomerated abrasive grains and/or powdered, glassy carbon.

9. An abrasive in accordance with claim 1 wherein at least a portion of said agglomerate grains include individual agglomerate grains formed from, in addition to said single abrasive grains and said first binder, at least one additive selected from the group consisting of silicone release agents and powdered, glassy carbon, in an amount of up to 80%, based on the total weight of said first binder and said additives.

10. An abrasive in accordance with claim 1 wherein said agglomerate grains are bound to a carrier and wherein in addition to said agglomerate grains, there is also bound to said carrier short, chopped carbon or graphite fibers of a length between 0.1 and 7 mm, in a proportion of up to 35 weight % of said second binder.

11. An abrasive in accordance with claim 10 wherein said short, chopped carbon or graphite fibers are present in a proportion of 1–10 weight % of said second binder.

12. A method for producing an abrasive, comprising:
forming a plurality of groups of agglomerate abrasive grains, each of said groups differing substantially from each of the other group or groups in the structural strength qualities, and therefore in the qualities of abrasive power and ability to sustain abrading forces, of the agglomerate grains thereof, wherein at least two of said groups of agglomerate grains are formed with different binding resins, said binding resins having compositions which are sufficiently different to obtain agglomerate abrasive grains of substantially different strength qualities, or wherein at least two of said groups of agglomerate grains are formed with individual abrasive grains of differing composition, said forming step of each of said groups comprising mixing individual abrasive grains with a binding resin, hardening, and breaking and separating into individual agglomerate grains of predetermined size; and binding said agglomerate grains in the presence of 0–70%, based on the weight of the agglomerate grains, of one or both of non-agglomerated abrasive grains and powdered, glassy carbon, to a carrier by means of a second binder.

13. A method in accordance with claim 12 or claim 14 wherein at least one of said groups of agglomerate grains are formed with the addition to said mixture of single abrasive grains and binding resin, of at least one additive selected from the group consisting of silicon release agents and powdered, glassy carbon, in an amount of up to 80%, based on the total weight of said binding resin and said additives.

14. A method for producing an abrasive, comprising:
forming a plurality of groups of agglomerate abrasive grains, each of said groups differing substantially from each of the other group or groups in the structural strength qualities, and therefore in the qualities of abrasive power and ability to sustain abrading forces, of the agglomerate grains thereof, wherein at least two of said groups of agglomerate grains are formed using the same binding resin but using different hardening times therefor, and/or using differing quantities thereof, said hardening times or said quantities being sufficiently different to provide agglomerate abrasive grains of said substantially different strength qualities, wherein said forming step of each of said groups comprises mixing individual abrasive grains with a binding resin, hardening, and breaking and separating into individual agglomerate grains of predetermined size; and binding said agglomerate grains in the presence of 0–70%, based on the weight of the agglomerate grains, of one of both of non-agglomerated abrasive grains and powdered, glassy carbon, to a carrier by means of a second binder.

15. A method in accordance with claim 12 or claim 14 wherein in said binding step there is also bound to said carrier short, chopped carbon or graphite fibers of a length between 0.1 and 7 mm, in a proportion of up to 35 weight % of said second binder.

16. An abrasive in accordance with claim 1 wherein said substantially different strength qualities among the groups of said agglomerate abrasive grains are obtained by one or more of the following: use of first binders of differing composition; use of abrasive grains of differing composition; use of the same first binder but using different hardening times therefor or use of different quantities thereof or differing types of additive, wherein said differences are sufficient to provide the groups of agglomerate abrasive grains with said substantially different strength qualities.

17. An abrasive in accordance with claim 1 wherein said second binder is selected from the group consisting of glutenous adhesive, urea-formaldehyde resin, and phenol-formaldehyde resin.

* * * * *